United States Patent [19]

Richardson

[11] 4,079,491

[45] Mar. 21, 1978

[54] METHOD AND APPARATUS FOR FORMING A VALVE SEAT BY INERTIA WELDING

[75] Inventor: Clyde W. Richardson, Rancho Palos Verdes, Calif.

[73] Assignee: Sargent Industries, Huntington Park, Calif.

[21] Appl. No.: 655,710

[22] Filed: Feb. 6, 1976

[51] Int. Cl.² .......................................... B23P 15/00
[52] U.S. Cl. ............................ 29/157.1 R; 228/113; 29/156.7 A
[58] Field of Search ................. 29/157.1 R, 156.7 R, 29/156.7 A; 228/112, 113; 156/73.5; 251/359

[56] References Cited

U.S. PATENT DOCUMENTS

| | | | |
|---|---|---|---|
| 2,101,970 | 12/1937 | Wissler | 251/359 |
| 2,903,564 | 9/1959 | Carr | 29/156.7 R |
| 3,478,411 | 11/1969 | Goloff et al. | 29/156.7 R |
| 3,504,425 | 4/1970 | Sutovsky et al. | 228/112 |
| 3,763,549 | 10/1973 | Bonneville et al. | 228/112 |
| 3,777,360 | 12/1973 | Welch | 228/112 |
| 3,780,412 | 12/1973 | Millard | 29/157.1 R |
| 3,917,497 | 11/1975 | Stickler | 156/73.5 |

Primary Examiner—C.W. Lanham
Assistant Examiner—Daniel C. Crane
Attorney, Agent, or Firm—Ellsworth R. Roston

[57] ABSTRACT

A valve seat may be formed deep within a valve body by attaching a wear-resistant material to a base material, such as by welding. Similarly, a drive member may be attached to either of the wear-resistant material or the base material. The thus-assembled structure can be rotated at high speeds adjacent a welding seat located deep within the valve body to create a friction or inertia weldment between the seat and base material. Subsequently, the drive material, weldment flash, etc., can be machined away and the wear-resistant material can be machined, if necessary, to create a valve seat of predetermined configuration.

20 Claims, 7 Drawing Figures

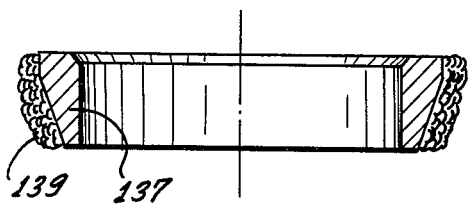
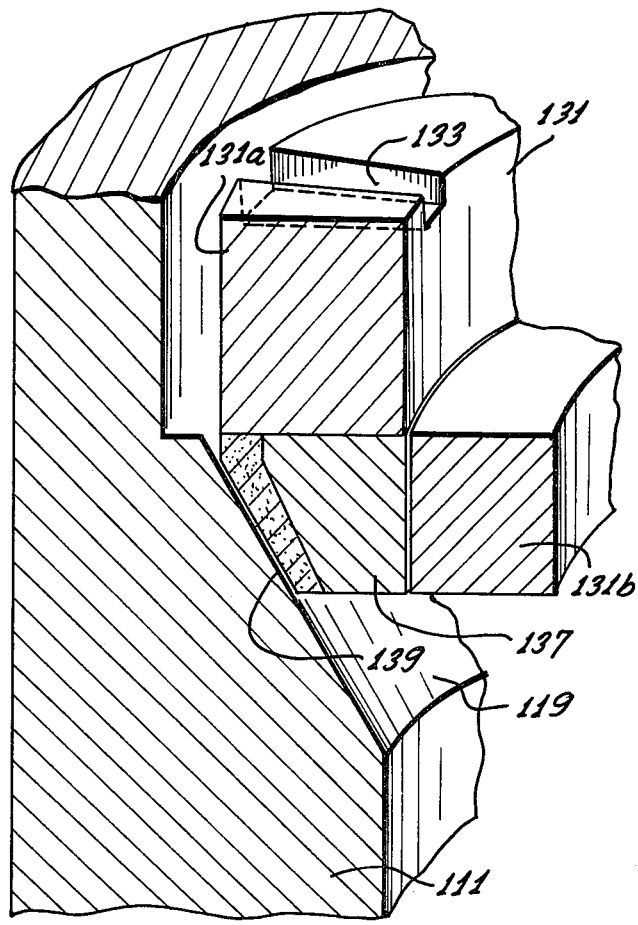
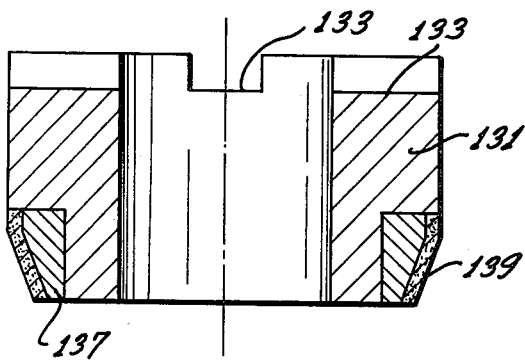

METHOD AND APPARATUS FOR FORMING A VALVE SEAT BY INERTIA WELDING

BACKGROUND OF THE INVENTION

In the production of some valves, it is necessary to provide a valve seat at a location in the valve body which is very difficult to reach from the exterior of the valve. For example, such a valve seat might face toward one end of the valve body passage, but be located at a position relatively distant from that end of the passage.

Many valves of this type are required to have a valve seat with high wear resistance. For example, a valve of this type might have to withstand liquid sodium such as is used in liquid metal breeder reactors at pressures near 375 PSI and temperatures greater than 200° F. It is imperative therefore that the valves be 100 % defect free. In such cases, it is often desired to use Stellite, 6, a chrome-cobalt-tungsten material, to form such a valve seat; but, it is impractical and/or impossible to make an entire valve body from such materials due to cost and other factors.

Consequently, such valves have been produced from a suitable ferrous or non-ferrous material by forming a welding surface at a predetermined location within the valve body. For example, the entire valve body, including the welding surface, might be formed from stainless steel. Then, a technician installed a plurality of continuous Stellite 6 beads about the welding surface until an enlarged seat-forming member had been created. Then, the plurality of beads would be machined to form the desired valve seat.

This formation of an oversized deposit for later machining was time consuming, tedious, and severely susceptible to defects. In other words, if the welder made a single mistake in laying down the plurality of beads, the entire valve body was destroyed. It has been found that such errors occurred in the range of 50% of the time. As stated previously, it is necessary that each valve be substantially 100% defect free. In order to insure such perfection, ultrasonic testing and liquid penetrant examination may be accomplished, along with visual study of the valve seat.

Although such wear-resistant seat could be formed by brazing within the stainless steel body, such a bond cannot be tested except visually and there is no guarantee that the valve will withstand the temperatures and pressures required. Such a seat could be formed by inertia welding the wear-resistant material directly into the valve body, but the amount of rotary energy and the upsetting forces required to achieve such a weld make such a process impractical in terms of satisfactory production of usable, undamaged valves.

Accordingly, it has become imperative to provide a method which can be utilized to consistently produce such defect free valves at a relatively rapid rate with little or no construction failure.

SUMMARY OF THE INVENTION

In accordance with the present invention, a relatively simple, high speed, and reliable method has been devised for producing a wear-resistant valve seat deep within a valve body passage.

The present invention envisions the use of a valve body formed from readily available materials, such as stainless steel. When a valve element is to be seated within the body, it is necessary to provide a suitable valve seat therein. When the valve seat is intended to be generally oriented toward one end of the valve body passage, but located at a position relatively distant from that end, the preferred embodiment of the present invention envisions the formation of a welding seat within the valve body at the time the body is formed. The welding seat is preferably located at a predetermined distance from the position in which the valve seat is to be located.

The present invention envisions the application of the wear-resistant material in the desired location of the valve seat by inertia or friction welding. Of course, those skilled in the art will realize that such welding is difficult if not impractical when it is desired to join a material such as Stellite 6 to stainless steel. This difficulty arises from the fact that such wear-resistant materials generally have higher temperature requirements for the plasticity or flow necessary for inertial welding. As a result, when attempts are made to weld the two metals together with this process, the stainless steel flows much sooner than does the wear-resistant material, causing the stainless steel to flow in a relatively uncontrolled manner and into locations to which it is difficult to machine away. Further, the rotary energy and upsetting forces required to achieve a welding flow of the wear material are often prohibitively large and/or damaging to the valve body itself.

In accordance with the present invention, the desired wear-resistant material is suitably attached to a base material or member at a work bench location outside of the valve. Preferably, the base material may be formed from the same metal as the valve body itself and may be configured to mate with the welding seat within the valve body. Similarly, a drive material or member may be attached to the wear-resistant material and/or the base material outside of the valve body. If desired, the driving member can be provided with structure which will cooperate with driver machinery when the inertia welding is to be accomplished.

Then, the assembled base member, driving member, and wear-resistant material may be inserted into the valve body until the base member contacts the welding seat with a predetermined rotational and axial force, causing the base member to be welded to the welding seat. Subsequently, the driving member may be machined away, as may a portion of the wear-resistant material, welding flash, etc.

In this manner, a valve seat may be constructed having a wear surface which, for example, will serve as a pilot for a valve disc which may seat against it to create a static seal when the disc is loaded against the seat. Of course, those skilled in the art will quickly realize that the present invention can be utilized with any type of valve configuration and many such configurations and alternative embodiments of the method and structure of the present invention, as defined by the appended claims, will quickly become evident upon reading of the following detailed description.

BRIEF DESCRIPTION OF THE DRAWINGS

FIG. 5 comprises a sectional view of a built-up wear resistant material which may be employed with a second embodiment or configuration of the invention;

FIG. 6 comprises a sectional view showing the structure of FIG. 5 mounted on a driving member; and FIG. 7 comprises an isometric illustration, partially broken away, illustrating the manner in which structure of the type shown in FIg. 6 may be inertia or friction welded on a welding seat in a valve body.

DETAILED DESCRIPTION

Figure 1:
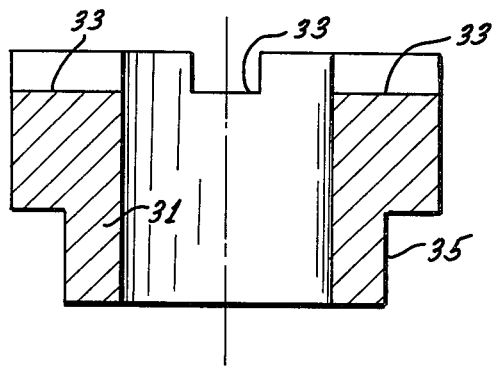
FIG. 1 comprises a sectional view of a driving member which might be utilized in accomplishing the present invention.
Figure 2:
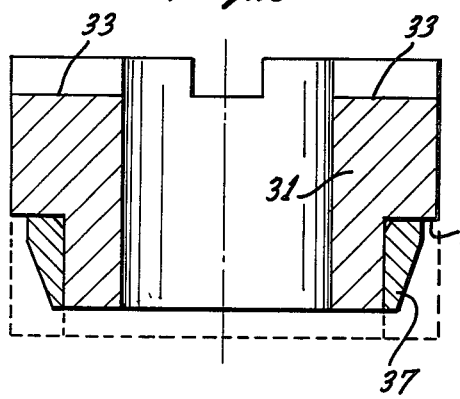
FIG. 2 comprises a view, similar to FIG. 1, illustrating the position in which a wear-resistant material might be fixed to the driving member.

Referring first to the embodiment of FIGS. 1-4, there is shown a valve body 11 having a passage 13 extending therethrough. The passage 13 has a first opening 15 and a second opening 17 at opposite ends of the valve body. A welding seat 19 may be provided in the valve body at a position distant from the first opening 15 and adjacent a recess or treepan 21.

Figure 3:
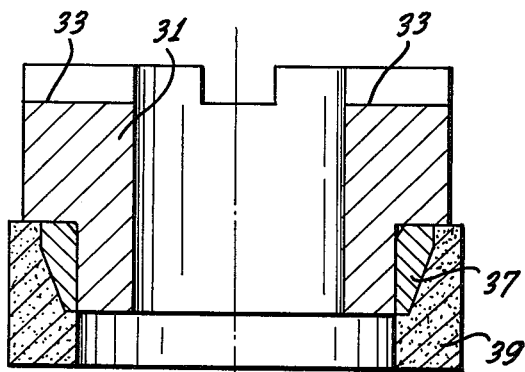
FIG. 3 comprises a view, similar to FIGS. 1 and 2, depicting a base material fixed to the drive member and the wear-resistant material.

In order to properly form a wear-resistant valve seat near the welding seat 19, a driving member 31 may be provided. As illustrated, the driving member may be provided with a plurality of radially oriented notches 33 for connection to a rotatable driving member (not shown) for a purpose to be described. The outer periphery of the driving member, opposite the notch end, may be provided with a peripheral recess 35 extending entirely about the outer wall thereof. A wear-resistant seat member 37 may be located in the driving member 31 in any suitable manner, such as by welding, etc. In other words, the seat 37 may be welded by hand in a plurality of beads which are then machined to the desired configuration. Similarly, a base material 39 may be fastened to either the wear-resistant material 37, the driving member 31, or both. As shown in FIG. 3, the base material 39, which is preferably the same material as that from which the body 11 is formed, may be slightly larger than the outer diameter of the driving member 31. This allows the manufacturer to machine the outer periphery of the driver 31 and base 39 so as to form a smooth cylinder exterior for the combined structure.

Figure 4:
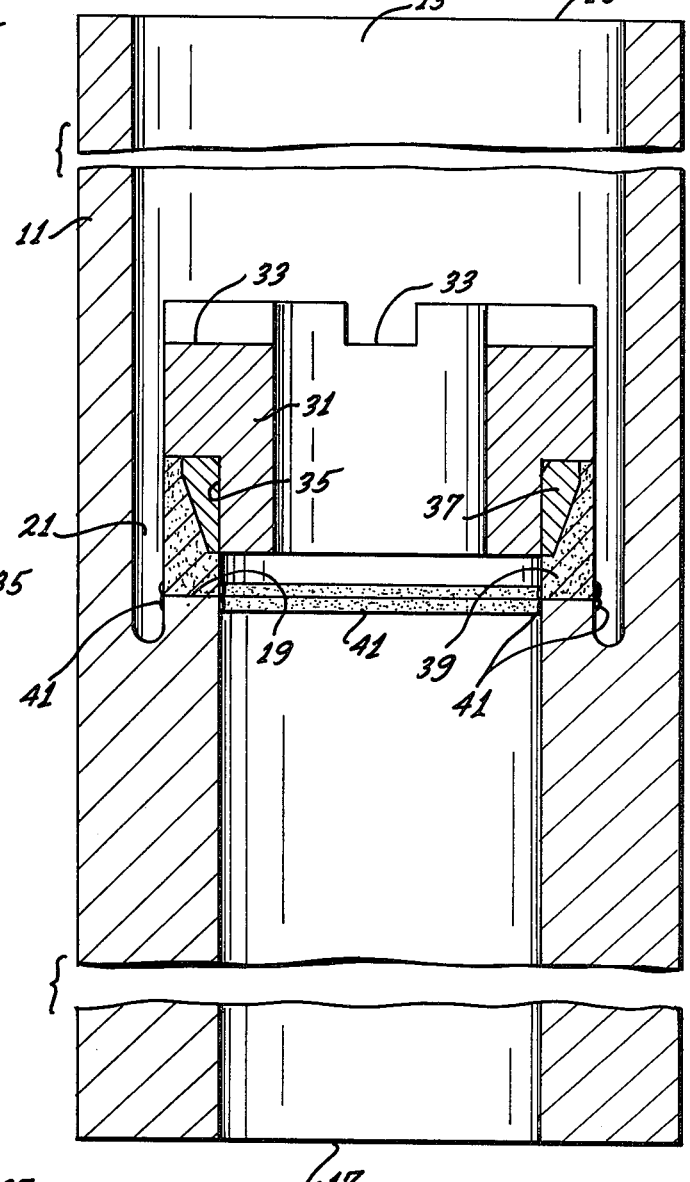
FIG. 4 comprises a sectional illustration of a valve body having a valve seat, to which the structure of FIG. 3 has been inertia or friction welded.

In producing a valve seat of the desired type, the combined structure shown in FIG. 3 may be mounted on a rotatable and axially movable drive structure and lowered into the valve body to the approximate position illustrated in FIG. 4. Utilizing well-known inertia and friction welding techniques, the base material 39, rotating closely adjacent and relative to the welding seat 19, may be welded to the seat 19, creating the usual welding flash 41. When the weld has been completed, the driving member 31 and the flash 41 may then be machined away by lowering a suitable cutting or reaming tool into the passage 13. Similarly, the edge of the wear-resistant material 37, which is illustrated in the drawing as being located adjacent the driving member 31, may then be suitably machined so as to allow a disc or other valve element to be seated thereagainst to create a static seal. It will thus be realized by those skilled in the art that the present invention is far less difficult and more consistently successful than the prior art methods for forming such a valve seat. On the other hand, there is no loss of ability to test the valve seat ultrasonically, with penetrants, and/or visually.

Turning now to FIG. 5, there is shown a wear-resistant material 137 upon which a base member 139 may be installed. For example, if the material of base member 139 is stainless steel, it can be fixed to the wear-resistance element 137 by TIG welding a plurality of beads thereon, as shown.

Subsequently, the base material 139 may be suitably machined into the configuration illustrated in FIG. 7.

As in the first embodiment described above, a driving member 139, having suitable drive slots 133, may then be fixed to either the wear-resistant material 137, the base member 139, or both.

Referring now to FIG. 7, a valve body 111 may be provided with a valve seat 119. Whereas the valve seat 19 of the first embodiment was radially oriented relative to the axis of the valve body, welding seat 119 may be conically oriented, as illustrated, along an angle suitable to cooperate in inertia or friction welding with the base material 139.

It will be noted that the driving member 131 as illustrated in FIG. 7 is slightly different than that illustrated in FIG. 6. Although the driving member may be a single, integral structure as illustrated in FIG. 6, it may, if desired, be formed as a two-element structure comprising a main body portion 131a which is fixed to the base member 139 and/or wear-resistant material 137, and a ring section 131b, which may, if desired, be fixed in some way to the body portion 131a and/or the wear-resistant material 137. With this embodiment, as the structure is lowered into the valve passage, ring section 131b will prevent the wear-resistant material from contracting toward its axis under the influence of the rotating and axially movable power source.

Although the valve body 111 of FIG. 7 is not illustrated with a treepan recess as shown in FIG. 4, those skilled in the art will realize that such a relief may be utilized in this embodiment of the invention. However, such is not necessary in every case, depending on the dimensional relationships of the parts. In any event, if the valve seat 119 and the base member 139 are formed along a common angle of approximately 45°, an enlarged welding interface will be formed and the tendency of the valve body to "roll out" under the inertial welding force, will be vastly reduced. Of course, as the angle, relative to the axis, is increased above 45°, the radial component of the welding force vector is reduced. Consequently, the amount of force required to produce a weld is similarly reduced. Those skilled in the art will also realize that the use of a base material which is the same as that of the welding seat allows a lesser force to be used in generating the weld and, therefore, the potential for body distortion will be still further reduced.

In any event, it has been determined that the angular relationship of a weld interface to the axis of a driving member may be varied throughout a range of approximately 15° to about 90° although equal radial and axial force vectors are generated at 45°, the radial component is enlarged, increasing the possibility of housing distortion. However, such distortion may be eliminated by using a stronger, i.e., heavier mass, housing member or by means such as a reinforcing ring.

Having now reviewed the detailed description and the accompanying drawings, those skilled in the art will quickly realize that the present invention may be embodied in a wide variety of structures many of which may not even resemble those depicted here, but which, nevertheless, employ the beneficial result of this invention disclosure.

I claim:

1. The method of forming a wear-resistant seat at a location within a deep valve body comprising the steps of providing a welding seat at a predetermined location within said valve body, providing a weldable base material of a size and configuration suitable for mating with said welding seat, fixing a wear-resistant material of suitable configuration to said base material, fixing a machinable driving member to at least one of the base material and the wear resistant material, inertia welding the base material to the welding seat, and removing the machinable driving member from the wear-resistant seat.

2. The method of claim 1 including the steps of machining the driving member out of the deep valve body, and machining the wear-resistant material to a predetermined seat configuration.

3. The method of claim 2 including the step of machining the base material and the deep valve body from the same material.

4. The method of claim 1 including the step of providing the base material and the welding seat to extend substantially radially relative to the axes thereof.

5. The method of claim 1 including the step of providing the base material and the welding seat to extend in cooperable conical directions relative to the axes thereof.

6. The method of claim 5 wherein said step recited in claim 4 is accomplished by forming said base material and said welding seat along cooperable 45° angles.

7. The method of claim 5 wherein said step recited in claim 4 is accomplished by forming said base material and said welding seat along cooperable angles within a range from about 15° to about 90°.

8. The method of claim 1 including the step of providing radial support for said wear-resistant material to prohibit radial movement thereof during said welding step.

9. The method of claim 1 including the steps of machining away any flash produced by inertia welding the base material to the welding seat, and machining away the driving member after the inertia welding of the base material to the welding seat.

10. The method of claim 9 including the step of machining the edge of the wear-resistant material after the inertia welding of the base material to the welding seat, the base material and the welding seat being made from the same material.

11. The method of forming a wear-resistant seat at a location within a deep valve body having a relatively low melting temperature and relatively soft properties, comprising the steps of providing a base member of a first material having a relatively low melting temperature and having relatively soft properties, welding to the base member a material having a relatively high melting temperature and having properties of resisting wear and of withstanding caustic or acidic materials attaching as by welding the base member or the wear-resistant material to a driving member dimensioned to fit the deep cylinder, inserting the driving member into the deep valve body with the base member engaging the valve seat of the deep valve body, inertia welding the base member and the valve body at the position of the seat within the deep valve body, and removing the driving member from the deep valve body.

12. The method set forth in claim 11 wherein the base member and the valve body are made from the same material.

13. The method set forth in claim 11 including the steps of machining the driving member out of the valve body, and machining the wear-resistant material to a particular seat configuration.

14. The method set forth in claim 11 including the step of machining away any flash produced by inertia welding the base member and the valve body, and machining away the driving member after the inertia welding of the base member and the valve body.

15. The method set forth in claim 14 including the step of machining the edge of the wear-resistant material after the welding of the base member and the valve body.

16. The method set forth in claim 14 wherein the base member and the valve body are made from the same material.

17. The method set forth in claim 16 including the steps of machining the driving member out of the deep valve body, and machining the wear-resistant material to a particular seat configuration.

18. The method set forth in claim 14 wherein the valve body is provided with an axis, and the base member and the seat within the valve body extend substantially perpendicular to such axis.

19. The method set forth in claim 18 wherein the valve body is provided with an axis, and the base member and the seat are provided with conical configurations relative to such axis.

20. The method set forth in claim 19 wherein the conical configurations of the base member and the seat provide matching surfaces to facilitate the inertia welding of the base member and the deep valve body at the location of the seat.

* * * * *